United States Patent [19]

Westwood et al.

[11] Patent Number: 4,848,443

[45] Date of Patent: Jul. 18, 1989

[54] PREPARATION OF FOUNDRY MOLDS OR CORES

[75] Inventors: Geoffrey W. Westwood, Walsall; Raymond A. Higgins, Rednal, both of England

[73] Assignee: Hepworth Minerals and Chemicals, Limited, Surrey, England

[21] Appl. No.: 77,972

[22] Filed: Jul. 27, 1987

Related U.S. Application Data

[63] Continuation of Ser. No. 721,980, Apr. 11, 1985, abandoned.

[30] Foreign Application Priority Data

Apr. 11, 1984 [GB] United Kingdom ............... 8409434

[51] Int. Cl.$^4$ ............................ C08L 6/10; B22C 1/22
[52] U.S. Cl. ...................................... 164/527; 164/16; 264/83; 523/145; 528/147; 528/158.5; 528/161
[58] Field of Search ................... 523/145; 164/527; 528/147

[56] References Cited

U.S. PATENT DOCUMENTS

| | | | |
|---|---|---|---|
| 4,166,799 | 9/1979 | Giacobbe | 252/182 |
| 4,426,467 | 1/1984 | Quist | 523/145 |
| 4,468,359 | 8/1984 | Lemon | 523/145 |
| 4,474,904 | 10/1984 | Lemon | 523/146 |

FOREIGN PATENT DOCUMENTS

| | | | |
|---|---|---|---|
| 50-130627 | 10/1975 | Japan | 523/145 |
| 1257181 | 12/1971 | United Kingdom . | |

OTHER PUBLICATIONS

Chemical Abstracts, vol. 78, No. 25, Jun. 25, 1973, "Concrete Mixture with Retarded Solidification on Set".

Primary Examiner—C. Warren Ivy
Attorney, Agent, or Firm—Cushman, Darby and Cushman .

[57] ABSTRACT

Foundry molds and cores are prepared by using as a binder a phenolic resin in solution in aqueous sodium hydroxide and using an ester to cure the binder. The ester may be incorporated in the mixture prior to shaping, or the ester in gaseous form may be passed through the shaped mixture.

2 Claims, No Drawings

PREPARATION OF FOUNDRY MOLDS OR CORES

This is a continuation of application Ser. No. 721,980, filed Apr. 11, 1985, which was abandoned upon the filing hereof.

BACKGROUND TO THE INVENTION

From one aspect, the present invention relates to a method of preparing a foundry mould or core.

SUMMARY OF THE INVENTION

The use of an aqueous solution of a sodium phenolate resole resin and an organic ester as a binder for foundry sand is disclosed in Japanese Patent publication No. 50-130627. In this publication, several specific examples of esters are mentioned but there is no disclosure of how the sodium phenolate resin solution is prepared. In the method described, both the sodium phenolate resin solution and the ester are mixed with the foundry sand and the mixture is then formed to the required shape.

In EP No. 86615A, there is disclosed the preparation of a foundry mould or core by mixing with sand a potassium alkali phenol-formaldehyde resin binder solution, forming the mixing to the required shape and then treating the formed mixture with the vapour of methyl formate. This application teaches that alkalii other than potassium alkali should not be present in major amounts, because they give products having lower strength. Furthermore, this application teaches that there should be used a phenol-formaldehyde resin having a weight average molecular weight of from 600 to 1500. It is stated that resins which fall outside this range give products which are relatively weak or build up strength more slowly. This application also states that solid contents of the resin solution below 50% are not used because the effectiveness of the binder is reduced.

The use of a potassium alkali phenolate resin as a foundry binder is also disclosed in EP No. 85512A. According to this application, the resins should be highly condensed, by which is meant having a weight average molecular weight of from 700 to 2000, and resins having a value greater than 950 are preferred. It is stated that resins with a weight average molecular weight less than 700 give products which are relatively weaker or require significantly more resin to achieve similar strengths. It is also stated that substituting the potassium hydroxide used by an equimolar amount of sodium hydroxide gives cores which typically have, after one hour, half the strength of cores made using potassium hydroxide as the alkali and only achieve two thirds the strength after twenty four hours.

We have discovered that cores having strengths superior to those achieved with the binder disclosed in EP No. 85512A can be achieved with resins which are less highly condensed than those which are to be used according to the teaching of EP No. 85512A but following the teaching of that published application that there should be used as a curing agent for the resin an ester which is mixed with the foundry aggregate before the resin solution is added.

In EP No. 027333A, there is disclosed the use as a foundry binder of a solution of a phenolic resin in aqueous alkali. Several alkalii are mentioned, including potassium hydroxide and sodium hydroxide. According to this application, the resin solution is prepared by reacting phenol with an aldehyde at a Ph of 8. The resin thus prepared is mixed with foundry sand and a lactone is then added as a curing agent. Finally, the selected alkali is added to the mix before the mixture is formed to the required shape. The recommended solids content of the resin solution and the viscosity of that solution are both relatively high. This application indicates that the solids content of the resin solution is preferably within the range 80% to 95% and that the viscosity of the resin solution is preferably within the range 5 to 15 Poise.

We have found that superior core strengths can be achieved if the procedure disclosed in EP No. 027333A is modified by using a solution of a phenolic resin in aqueous sodium hydroxide with a lower solids content.

In the preparation of foundry cores and moulds, binders with different properties are required in different circumstances. Many factors must be taken into consideration when selecting a foundry binder and such selection must be the result of compromise between conflicting requirements. It is advantageous to have available a variety of binders with different attributes.

It is an object of the present invention to provide a foundry binder which possesses at least some of the advantages of the binders disclosed in the published applications hereinbefore mentioned and which differs in certain respects from those known binders.

According to a first aspect of the invention, there is provided a method of preparing a foundry mould or core wherein an aldehyde is reacted with a sodium phenolate in aqueous solution, the reaction product, in alkaline aqueous solution, is mixed with a foundry aggregate, the mixture is formed to the required shape and the vapour of an organic ester is passed into the formed mixture.

The sodium phenolate is preferably the phenolate of phenol, $C_6H_5OH$, but sodium salts of other phenols may be used. The preferred aldehyde is formaldehyde but other aldehydes may be used in conjunction with, or in place of formaldehyde.

The degree of polymerisation reached in reacting the aldehyde with the sodium phenolate, prior to mixing with the foundry aggregate, is preferably low, as compared with the degree of polymerisation achieved in the methods disclosed in the aforementioned published applications. Thus, the weight average molecular weight of the organic constituents of the aqueous solution which is mixed with the foundry aggregate may be below 600.

The reaction between the aldehyde and the sodium phenolate is preferably carried out by dissolving all of the phenol required for preparation of the resin in an aqueous solution containing all of the sodium hydroxide required for preparation of the resin solution and then adding formaldehyde slowly so that the concentration of free aldehyde in all parts of the solution is always at a low level. Alternatively, some of the required sodium hydroxide may be introduced after addition of the formaldehyde has been completed, for example after the reaction between the formaldehyde and the sodium phenolate has substantially ceased.

The preferred organic ester is methyl formate and this is preferably one constituent of a gaseous mixture which is passed into the formed foundry mix. The other constituent may be nitrogen or another gas. The nitrogen may be bubbled through liquid methyl formate to generate the vapour. Heat may be supplied to the methyl formate at a selected rated to generate the vapour at a selected rate.

Generally, it is necessary to pass the methyl formate into the formed foundry mix for a period of a few seconds only. Flow of gas to the formed foundry mix may then be terminated and, after a further interval of a few seconds, unused methyl formate may be purged from the formed foundry mix by causing a purging gas to flow through the mix. Nitrogen may also be used as the purging gas.

According to a second aspect of the invention, there is provided a method of preparing a foundry mould or core wherein an aldehyde is introduced into an alkaline solution of a phenol and is reacted with the phenol to produce a resin composition having a weight average molecular weight not exceeding 1500, the resin composition is mixed with a foundry aggregate and an organic ester, the mixture is formed to the required shape and is then permitted to cure, the compression strength after one hour being at least 2500 KN/m$^2$. The weight average molecular weight of the resin composition may be not greater than 1000.

In a case where the foundry aggregate is a silica sand, the weight of resin composition used is preferably no greater than 2% and may be no greater than 1.5% of the weight of sand.

The molar ratio of alkali to phenol in the resin composition which is mixed with the sand is preferably no greater than 0.75:1.

The alkali is preferably sodium hydroxide, by this we mean that the alkali is at least mainly sodium hydroxide. There may be relatively small amounts of other alkalii present.

The solids content of the resin composition preferably does not exceed 50% by weight. The solids content of the resin composition is determined by heating a sample of the resin composition at 150° C. to constant weight. We have found that increasing the solids content of the resin composition above 50% does not result in the achievement of improved core strengths and generally results in lower core strengths.

According to a third aspect of the invention, there is provided a method of preparing a foundry mould or core wherein an aldehyde is added to a solution of a phenol in aqueous sodium hydroxide, the aldehyde and phenol react together to form a resin composition having a weight average molecular weight not greater than 1500, the resin composition is mixed with a foundry aggregate and an organic ester, the mixture is formed to the required shape and is then permitted to cure and wherein the compressive strength after 24 hours is at least 5500 KN/m$^2$.

According to a fourth aspect of the invention, there is provided a method of preparing a foundry mould or core wherein an aldehyde is reacted with a phenol in the presence of an alkali to form a composition called herein a resin composition, the resin composition is mixed with a foundry aggregate and with an organic ester, the mixture is formed to the required shape and permitted to cure, wherein the alkali is sodium hydroxide.

The molar ratio of phenol to aldehyde used in preparation of the resin composition is preferably with the range 1:1 to 1:3 and is more preferably within the range 1:1.3 to 1:2.5.

The resin composition may be such that the residual solids obtained on heating a sample of the resin composition at 150° C. to constant weight are within the range 40% to 65% of the weight of the sample. The viscosity of the resin composition, measured using an Ostwald viscometer at 25° C. is preferably within the range 100 to 1400 centipoise. We have found that resin compositions with viscosities not exceeding 500 centipoise produce cores of high strengths, when used in a preferred method in accordance with the invention.

The weight average molecular weight, as determined by gel permeation chromatography, of the resin composition is preferably within the range 500 to 1100.

The weight of alkali used (100% solids basis) in preparation of the resin composition is preferably within the range 5% to 55% of the sum of the weights of aldehyde and phenol used. We have found that cores having high strengths are formed when a weight of sodium hydroxide which is approximately 50% of the weight of aldehyde and phenol is used.

The molar ratio of alkali used in preparation of the resin composition to phenol used in the preparation of that composition is preferably within the range 0.4:1 to 0.75:1. The alkali and phenol may be used in a molar ratio within the range 0.4:1 to 0.9:1 and the use of alkali and phenol in a molar ratio within the range 0.25:1 to 1.1:1 is within the scope of the invention.

The ester used for curing the resin may be a lactone. Suitable lactones include propiolactone, butyrolactone, caprolactone and valerolactone. Other esters which may be used include esters of short and medium chain alkyl mono or polyhydric alcohols with short or medium chain carboxylic acids. By short or medium chain, we mean chains comprising one to twelve carbon atoms. Mixtures of esters may be used. The weight of ester is preferably within the range 15% to 95% of the weight of resin composition, more preferably between 20% and 50% of the weight of the resin composition.

We have found that the achievement of a high degree of condensation of the phenol and aldehyde, that is of a high molecular weight of the reaction product, does not result in the highest strength for a given ratio between the weight of binder and the weight of foundry aggregate. We have found that the strength is dependent on each of the following factors and that compensation for a change in one of the factors can be achieved by varying one or more of the other factors. The factors are:

molar ratio of phenol:formaldehyde used in preparation of the resin composition;

weight average molecular weight of the organic materials present in the resin composition;

identity of the alkali present in the resin composition;

molar ratio of alkali to phenol used in preparation of the resin composition; and identity of ester or identitites of esters mixed with the resin composition and foundry aggregate.

DESCRIPTION OF EXAMPLES

A number of examples of methods embodying the present invention will now be described.

In each example, a resin composition was prepared by dissolving a selected quantity of pure phenol in sufficient 50% aqueous solution of sodium hydroxide to achieve a selected molar ratio of alkali to phenol within the range 0.4 to 0.75. The resulting alkaline solution was heated to 95° C. and liquid formaldehyde was added slowly, whilst maintaining the temperature at 95° C. The amount of formaldehyde added was such as to achieve a selected molar ratio of phenol to formaldehyde within the range 1:1.5 to 1:2.5. The formaldehyde was reacted with the alkaline solution of phenol at 95° C. until the desired degree of polymerisation had been achieved, as indicated by a determination of the molecular weight and/or a determination of the viscosity. In some cases, distillation may be carried out when the desired molecular weight or viscosity has been achieved, to adjust the residual solids content of the resin composition.

The resin composition was cooled to 30° C. and a selected amount of a silane, typically γ-aminopropyl triethoxysilane. The weight of the silane is within the range 0.05% to 3%, preferably within the range 0.1% to 0.6%, of the weight of the resin composition.

For Examples 1 to 6, a resin composition having the following characteristics was prepared.

| Molar ratio phenol:formaldehyde | 1:1.75–1:2 |
|---|---|
| Molar ratio sodium hydroxide:phenol | 0.65:1 |
| $M_{\overline{W}}$ | 700 to 800 |
| Solids content | 45% to 49% |
| Weight of silane | 0.4% of weight of resin composition. |

$M_{\overline{W}}$ was determined by subjecting the cooled resin composition to gel permeation chromatography without modification of the composition.

1000 grams of foundry sand were added to a Fordath laboratory core mixer and mixed for 90 seconds with 4.5 gram of the selected hardner. The selected amount of resin composition was then added and mixing continued for a further 60 seconds. In some cases, the hardner was a single ester, in other cases a mixture of esters. Immediately after preparation, the mix was discharged and rammed into a number of 50 mm AFS cylinders to form compression test pieces. These were placed in a standard atmosphere and maintained at 20° C. and 50% relative humidity. Sample test pieces were withdrawn at regular intervals and subjected to testing for compression strength. In each of Examples 1 to 6, the amount of resin composition used was 15 g, representing 1.5% of the weight of sand. The weight of hardner used was 30% of the weight of resin composition. The results obtained in Examples 1 to 6 are set out in Table 1.

Results achieved with Examples 7 to 16 are set out in Table 2. For these examples, a procedure similar to that hereinbefore described with reference to Examples 1 to 6 was followed. However, in each of Examples 7 to 16, there were prepared two sets of sample test pieces, one set incorporating butyrolactone alone as the hardner and the other set incorporating a mixture of butyrolactone and triacetin as the hardner. Furthermore, samples of the resin compositions used in Examples 7 to 16 were acidified to precipitate polymer therefrom and the weight average molecular weight of the precipitated polymer was determined by gel permeation chromotography. The values of $M_{\overline{W}}$ thus obtained are substantially higher than the values of $M_{\overline{W}}$ obtained for the resin compositions, indicating that these compositions include substantial amounts of dimer, trimer or unreacted monomer.

For Examples 17, 18 and 19, there was prepared an alkaline resin composition by the procedure hereinbefore described in relation to Examples 1 to 6. 1 kg of foundry sand was then charged into a Fordath laboratory core mixer and mixed for two minutes with 15 g of the alkaline resin composition. The resulting mixture was used to prepare 50 mm AFS cylinder compression test pieces by using a perforated bottom plate to the cylinder with a recess which could be connected to a source of negative pressure. The upper end of the cylinder was sealed with another perforated plate connected to a bubbler containing liquid methyl formate at ambient temperature. Vacuum was applied to the bottom plate, causing air to bubble through the methyl formate and carry the vapour of the ester through the test pieces for several seconds. It was found that optimum strengths could be achieved when methyl formate was carried into each test piece for a period of ten seconds. Subsequently, the test pieces could be purged with air or with nitrogen. Nitrogen may be used to carry to vapour of the ester. Other esters mentioned in the prior art may be used.

For each of Examples 17, 18 and 19, there was used a resin composition having the following characteristics.

| Molar ratio phenol:formaldehyde | 1:1.75 to 1:2 |
|---|---|
| Molar ratio sodium hydroxide:phenol | 0.65:1 |
| $M_{\overline{W}}$ | 700 to 800 |
| Solids content | 45% to 49% |
| Weight of silane | 0.4% of weight of resin composition |

The results obtained in Examples 16 to 19 are set out in Table 3.

For Examples 20 to 29, the procedure hereinbefore described in relation to Examples 17, 18 and 19 was followed using the resin compositions of Examples 7 to 16 respectively. The weight of resin composition used was 2% of the weight of sand. The results obtained with Examples 20 to 29 are set out in Table 4.

It will be noted from Table 2 that when $M_{\overline{W}}$ is significantly greater than 1000 (Example 12) the compression strength achieved after 24 hours and the strengths achieved after shorter periods are considerably lower than are the strengths achieved with otherwise similar resin compositions having $M_{\overline{W}}$ below 1000. Example 15 in Table 2 illustrates that use of a resin composition having a solids content substantially in excess of 50% also results in relatively low core strengths. It will be seen that, when the solids content of the resin composition is not substantially greater than 50% by weight and $M_{\overline{W}}$ of the resin composition is not substantially greater than 1000, cores produced by mixing the resin composition, sand and hardner before shaping of the mixture achieve after 24 hours compression strengths in excess of 5500 KN/m$^2$ and after one hour compression strengths in excess of 2700 KN/m$^2$.

Example 7 illustrates that use of a mixture of triacetin and butyrolactone as curing agent in place of butyrolactone alone results in the achievement of significantly lower strengths, when the molecular weight of the resin is relatively low. It is believed that the rate of hydrolysis of the ester curing agent has a significant effect on the strength achieved, a higher rate of hydrolysis contributing to higher strengths. Example 15 shows that it is possible to compensate by use of a higher proportion of the aldehyde and of a higher molecular weight resin for substitution of triacetin for a part of the butyrolactone curing agent.

Table 4 shows that when $M_{\overline{W}}$ is significantly greater than 1000 (Example 25) the transverse strength achieved at various times is considerably lower than the transverse strengths achieved when there are used otherwise similar resin compositions having $M_{\overline{W}}$ below 1000. Table 4 shows that when there is used a resin composition having $M_{\overline{W}}$ below 1000 and the weight of resin composition is 2% of the weight of foundry aggregate (silica sand), then the transverse strength achieved after twenty seconds is in excess of 9 kgf/cm$^2$ and is generally in excess of 12 kgf/cm$^2$. Furthermore, the strength achieved after fifteen minutes is generally in excess of 13 kgf/cm$^2$. Table 4 also shows that a transverse strength near to that achieved after twenty four hours is achieved within five minutes, using the resin compositions herein described.

In table 5, there are set out results obtained by procedures generally as hereinbefore described with reference to examples 7 to 16. These examples show that similar bench lives and set times are achieved at different ratios of phenol to sodium hydroxide.

Table 6 shows results obtained with procedures generally as hereinbefore described with reference to examples 7 to 16 but with varying ratios of phenol:formaldehyde. Example 42 shows that a rather long set time and rather low strengths result from the use of a resin in which the phenol:formaldehyde ratio is 1:1.5. If the weight average molecular weight of the resin is relatively low. Example 43 shows that the set time and the strength are significantly improved if a somewhat higher molecular weight resin is used. Example 51 illustrates that a short set time and good strengths are achieved with a weight average molecular weight of only 550. Comparison of examples 44 and 51 illustrate that a decrease in the ratio of phenol to formaldehyde results in a substantial reduction in both bench life and set time. We have found that the bench life which results from use of a phenol to formaldehyde ratio less than 1 to 2 is excessively short.

Table 7 and 8 show results obtained using gasing procedures generally as hereinbefore described with reference to examples 17, 18 and 19. Comparison of examples A and J illustrates that increasing the ratio of sodium hydroxide to phenol improves significantly the strengths achieved at various times. This is also apparent from a comparison of examples B and G.

The features disclosed in the foregoing description, or the following claims, or the accompanying drawings, expressed in their specific forms or in terms of a means for performing the disclosed function, or a method or process for attaining the disclosed result, or a class or group of substances or compositions, as appropriate, may, separately or any combination of such features, be utilised for realising the invention in diverse forms thereof. Resin compositions having any or all of the characteristics hereinbefore mentioned within the ranges hereinbefore indicated may be used in the invention.

TABLE 1

| Example: | (1) | (2) | (3) | (4) | (5) | (6) |
|---|---|---|---|---|---|---|
| P:F ratio | 1:2.0 | 1:2.0 | 1:1.75 | 1:1.75 | 1:1.75 | 1:1.75 |
| Visc. (cP) @ 25° C. | 170 | 170 | 400 | 400 | 490 | 490 |
| M$_{\overline{w}}$ | 790 | 790 | 710 | 710 | 760 | 760 |
| %-butyrolactone addition (BOR) | 30 | 12 | 30 | 12 | 30 | 12 |
| % triacetin (BOR) | — | 18 | — | 18 | — | 18 |
| Bench life (mins) | 5 | 8 | 4 | 9 | 7 | 15 |
| Set time (mins) | 7 | 12 | 6 | 12 | 10 | 18 |
| Compression strength KN/m$^2$ after: | | | | | | |
| 1 hour | 3200 | 2850 | 3900 | 3500 | 2850 | 2800 |
| 2 hours | 4100 | 3800 | 5100 | 4750 | 4150 | 3950 |
| 3 hours | 6200 | 5850 | 7750 | 5850 | 6800 | 6000 |
| 24 hours | 7250 | 6800 | 8400 | 7200 | 7350 | 7150 |

The abbreviation BOR used herein means based on weight of resin.

TABLE 2

| Example: | 7 | 8 | 9 | 10 | 11 | 12 | 13 | 14 | 15 | 16 |
|---|---|---|---|---|---|---|---|---|---|---|
| P:F Ratio | 1:1.75 | 1:1.75 | 1:1.75 | 1:2.0 | 1:2.0 | 1:2.0 | 1:2.0 | 1:2.0 | 1:2.0 | 1:1.75 |
| NaOH:Phenol Ratio | 0.65:1 | 0.65:1 | 0.65:1 | 0.65:1 | 0.65:1 | 0.65:1 | 0.65:1 | 0.65:1 | 0.65:1 | 0.65:1 |
| M$_{\overline{w}}$ Solution | 500 | 710 | 760 | 640 | 790 | 1120 | 420 | 480 | 730 | 760 |
| M$_{\overline{w}}$ precipitated polymer | 610 | 950 | 1080 | 910 | 1120 | — | 540 | 610 | — | 970 |
| Visc. (cP) @ 25° C. | 200 | 400 | 710 | 130 | 170 | 420 | 180 | 450 | 150 | 760 |
| Solids content % | 47.9 | 48.9 | 49.4 | 49.0 | 49.5 | 51.1 | 48.5 | 51.7 | 58.2 | 49.6 |
| % butyrolactone (BOR) | 30 | 30 | 30 | 30 | 30 | 30 | 30 | 30 | 30 | 30 |
| Bench life (mins) | 4 | 4 | 4 | 5 | 5 | 1 | 4 | 4 | 4 | 7 |
| Set time (mins) | 7 | 6 | 6 | 7 | 7 | 2 | 6 | 7 | 5 | 10 |
| Compression strength KN/m$^2$ after: | | | | | | | | | | |
| 1 hour | 3850 | 3900 | 4050 | 3150 | 3200 | 1100 | 3100 | 3250 | 2400 | 2850 |
| 2 hours | 4950 | 5100 | 5300 | 4350 | 4100 | 2500 | 4700 | 4850 | 3200 | 4150 |
| 3 hours | 6600 | 7750 | 7850 | 6350 | 6200 | 3150 | 5950 | 6050 | 4800 | 6800 |
| 24 hours | 7550 | 8400 | 8600 | 7000 | 7250 | 4000 | 6750 | 7100 | 5150 | 7350 |
| %-butyrolactone (BOR) | 12 | 12 | 12 | 12 | 12 | 12 | 12 | 12 | 12 | 12 |
| % triacetin (BOR) | 18 | 18 | 18 | 18 | 18 | 18 | 18 | 18 | 18 | 18 |
| Bench life (mins) | 11 | 9 | 9 | 9 | 8 | 3 | 8 | 9. | 7 | 15 |
| Set time (mins) | 15 | 12 | 12 | 12 | 12 | 5 | 13 | 13 | 11 | 18 |
| Compression strength KN/m$^2$ after: | | | | | | | | | | |
| 1 hour | 1000 | 3500 | 3700 | 2700 | 2850 | 1100 | 3150 | 3200 | 3300 | 2800 |
| 2 hours | 2550 | 4750 | 4950 | 4300 | 3800 | 1900 | 4500 | 4750 | 4850 | 3950 |
| 3 hours | 3400 | 5850 | 5800 | 5700 | 5850 | 2000 | 5300 | 5500 | 5685 | 6000 |
| 24 hours | 5850 | 7200 | 7250 | 6250 | 6800 | 2250 | 6050 | 6300 | 6700 | 7150 |

TABLE 3

| Example: | 17 | 18 | 19 |
|---|---|---|---|
| P:F ratio | 1:2.0 | 1:1.75 | 1:1.75 |
| Viscosity (cP) | 170 | 400 | 490 |
| M$_{\overline{w}}$ | 790 | 710 | 760 |
| Compression strength KN/m$^2$ | | | |
| 1 min. | 2100 | 2500 | 1900 |
| 5 mins | 2900 | 2600 | 2200 |
| 1 hour | 3200 | 2900 | 2400 |
| 3 hours | 3700 | 3300 | 2700 |
| 24 hours | 4100 | 3600 | 3200 |

TABLE 4

| Example: | 20 | 21 | 22 | 23 | 24 | 25 | 26 | 27 | 28 | 29 |
|---|---|---|---|---|---|---|---|---|---|---|
| (1) Compression strength (2% resin addition) $kN/m^2$ after | | | | | | | | | | |
| 1 min. | 2400 | 2500 | 2300 | 2700 | 2100 | 1900 | 2200 | 2300 | 2600 | 1900 |
| 5 mins. | 2700 | 2600 | 2400 | 2900 | 2900 | 2100 | 2400 | 2600 | 3000 | 2200 |
| 1 hour | 3000 | 2900 | 2700 | 3200 | 3200 | 2200 | 2800 | 2800 | 3500 | 2400 |
| 3 hours | 3200 | 3300 | 2800 | 3300 | 3700 | 2400 | 3100 | 3000 | 3700 | 2700 |
| 24 hours | 3300 | 3600 | 3000 | 3900 | 4100 | 2700 | 3300 | 3400 | 4200 | 3200 |
| (2) Transverse test pieces $Kgf/cm^2$ (2% resin addition) | | | | | | | | | | |
| 20 secs. | 11.9 | 13.2 | 9.3 | 13.3 | 14.9 | 8.9 | 12.7 | 13.7 | 20.6 | 15.1 |
| 5 mins. | 18.9 | 19.1 | 9.9 | 13.6 | 19.1 | 9.5 | 15.4 | 16.1 | 23.5 | 16.2 |
| 15 mins. | 19.3 | 19.3 | 10.3 | 13.7 | 19.3 | 9.7 | 18.2 | 18.4 | 23.9 | 18.6 |
| 30 mins. | 19.4 | 19.6 | 10.4 | 13.9 | 19.8 | 9.8 | 18.7 | 18.9 | 24.4 | 19.5 |
| 60 mins. | 19.5 | 20.0 | 10.5 | 14.1 | 20.1 | 9.8 | 18.9 | 19.0 | 24.9 | 19.7 |
| 24 hours | 19.5 | 20.1 | 10.6 | 15.4 | 20.2 | 9.9 | 18.9 | 19.2 | 25.2 | 19.9 |

TABLE 5

| EXAMPLE | 30 | 31 | 32 | 33 | 34 | 35 | 36 | 37 | 38 | 39 | 40 | 41 |
|---|---|---|---|---|---|---|---|---|---|---|---|---|
| P:F Ratio | 1:2.0 | 1:2.0 | 1:2.0 | 1:2.0 | 1:2.0 | 1:2.0 | 1:2.0 | 1:2.0 | 1:2.0 | 1:2.0 | 1:2.0 | 1:2.0 |
| NaOH:Phenol ratio | 0.55:1 | 0.55:1 | 0.55:1 | 0.58:1 | 0.58:1 | 0.58:1 | 0.625:1 | 0.625:1 | 0.66:1 | 0.68:1 | 0.68:1 | 0.72:1 |
| $M_w$ | 500 | 570 | 700 | 640 | 840 | 1050 | 550 | 590 | 610 | 570 | 930 | 510 |
| $M_w$ | 590 | 660 | 840 | 760 | 930 | 1250 | 670 | 740 | 760 | 670 | 1030 | 620 |
| Visc. (cP) @ 25° C. | 210 | 470 | 730 | 230 | 500 | 800 | 310 | 230 | 370 | 170 | 410 | 135 |
| Solids content (%) | 51.1 | 51.9 | 49.3 | 48.6 | 48.7 | 49.7 | 51.1 | 49.5 | 49.1 | 48.3 | 49.4 | 49.0 |
| % Butyrolactone (BOR) | 30 | 30 | 30 | 30 | 30 | 30 | 30 | 30 | 30 | 30 | 30 | 30 |
| Bench life (mins) | 3 | 3 | 3 | 4 | 3 | 3 | 4 | 4 | 4 | 6 | 4 | 4 |
| Set time (mins) | 4 | 4 | 4 | 5 | 4 | 4 | 5 | 5 | 5 | 8 | 5 | 5 |
| Compression strength ($kN/m^2$) after: | | | | | | | | | | | | |
| 1 hour | 2500 | 2950 | 2750 | 3450 | 1850 | 2600 | 3000 | 3250 | 3150 | 3400 | 3900 | 2850 |
| 2 hours | 3500 | 3850 | 3600 | 4650 | 3750 | 4150 | 4350 | 4600 | 4200 | 4700 | 5550 | 4000 |
| 3 hours | 4150 | 4500 | 4400 | 5600 | 4800 | 5200 | 5400 | 5500 | 5000 | 6050 | 6100 | 5700 |
| 24 hours | 5600 | 6000 | 5750 | 6850 | 5550 | 5700 | 7600 | 7300 | 8800 | 7150 | 6950 | 6400 |
| % Butyrolactone (BOR) | 12 | 12 | 12 | 12 | 12 | 12 | 12 | 12 | 12 | 12 | 12 | 12 |
| % Triacetin (BOR) | 18 | 18 | 18 | 18 | 18 | 18 | 18 | 18 | 18 | 18 | 18 | 18 |
| Bench life (mins) | 9 | 8 | 6 | 10 | 7 | 8 | 8 | 7 | 8 | 11 | 9 | 9 |
| Set time (mins) | 12 | 10 | 8 | 13 | 10 | 10 | 10 | 9 | 11 | 15 | 12 | 12 |
| Compression strength ($kN/m^2$) after: | | | | | | | | | | | | |
| 1 hour | 2400 | 2700 | 2600 | 3150 | 1600 | 2350 | 2750 | 3150 | 2900 | 3050 | 3650 | 2500 |
| 2 hours | 3700 | 3450 | 3450 | 4300 | 3350 | 4000 | 4000 | 4550 | 4000 | 4400 | 5100 | 3900 |
| 3 hours | 4400 | 4400 | 4150 | 5500 | 4450 | 5100 | 5100 | 5000 | 4700 | 5850 | 6000 | 5300 |
| 24 hours | 5300 | 5850 | 5500 | 6450 | 5100 | 5450 | 7200 | 6500 | 7650 | 6900 | 6700 | 6400 |

TABLE 6

| EXAMPLE | 42 | 43 | 44 | 45 | 46 | 47 | 48 | 49 | 50 | 51 | 52 | 53 |
|---|---|---|---|---|---|---|---|---|---|---|---|---|
| P:F Ratio | 1:1.5 | 1:1.5 | 1:1.75 | 1:1.75 | 1:1.75 | 1:1.75 | 1:1.75 | 1:1.95 | 1:1.20 | 1:2.0 | 1:2.0 | 1:2.2 |
| NaOH:Phenol ratio | 0.625:1 | 0.625:1 | 0.625:1 | 0.625:1 | 0.625:1 | 0.625:1 | 0.625:1 | 0.625:1 | 0.625:1 | 0.625:1 | 0.625:1 | 0.625:1 |
| $M_w$ solution | 440 | 850 | 530 | 1330 | 660 | 680 | 710 | 580 | 930 | 550 | 590 | 500 |
| $M_w$ Precipitated polymer | 570 | 1030 | 630 | 1500 | 780 | 830 | 950 | 690 | 1040 | 670 | 740 | 630 |
| Visc. (cP) @ 25° C. | 400 | 1100 | 360 | 1650 | 260 | 350 | 900 | 300 | 1400 | 310 | 230 | 870 |
| Solids content (%) | 64.3 | 64.4 | 50.1 | 60.6 | 48.3 | 50.7 | 51.2 | 48.8 | 49.6 | 51.1 | 49.5 | 46.9 |
| % Butyrolactone (BOR) | 30 | 30 | 30 | 30 | 30 | 30 | 30 | 30 | 30 | 30 | 30 | 30 |
| Bench life (mins) | 16 | 7 | 8 | 3 | 4 | 4 | 4 | 4 | 3 | 4 | 4 | 1 |
| Set time (mins) | 20 | 10 | 10 | 4 | 6 | 6 | 5 | 7 | 4 | 5 | 5 | 1 |
| Compression strength ($kN/m^2$) after: | | | | | | | | | | | | |
| 1 hour | 1200 | 3500 | 2450 | 2800 | 3250 | 3150 | 3200 | 3400 | 1950 | 3000 | 3250 | 450 |
| 2 hours | 1850 | 5300 | 3650 | 4300 | 4200 | 4350 | 4200 | 4750 | 4100 | 4350 | 4600 | 1650 |
| 3 hours | 2850 | 5900 | 4700 | 5600 | 5000 | 4700 | 4500 | 5900 | 4950 | 5400 | 5500 | 1950 |
| 24 hours | 4650 | 7150 | 6050 | 6100 | 6700 | 6400 | 6600 | 7350 | 6050 | 7600 | 7300 | 2400 |
| % Butyrolactone (BOR) | 12 | 12 | 12 | 12 | 12 | 12 | 12 | 12 | 12 | 12 | 12 | 12 |
| % Triacetin (BOR) | 18 | 18 | 18 | 18 | 18 | 18 | 18 | 18 | 18 | 18 | 18 | 18 |
| Bench life (mins) | 33 | 11 | 11 | 6 | 8 | 7 | 7 | 8 | 6 | 8 | 7 | 3 |
| Set time (mins) | 42 | 15 | 14 | 9 | 11 | 10 | 9 | 11 | 8 | 10 | 9 | 4 |
| Compression strength ($kN/m^2$) after: | | | | | | | | | | | | |
| 1 hour | 550 | 3150 | 2100 | 2600 | 2800 | 2750 | 2900 | 3350 | 1900 | 2750 | 3150 | 1500 |
| 2 hours | 1650 | 4700 | 3450 | 3750 | 3750 | 3850 | 4000 | 4300 | 3600 | 4000 | 4550 | 2200 |
| 3 hours | 2350 | 5750 | 4150 | 4900 | 4350 | 4300 | 4100 | 5450 | 4500 | 5100 | 5000 | 3300 |
| 24 hours | 3900 | 6250 | 5450 | 5650 | 6000 | 5850 | 5400 | 7000 | 5750 | 7200 | 6500 | 4100 |

TABLE 7

| EXAMPLE | 54 | 55 | 56 | 57 | 58 | 59 | 60 | 61 | 62 | 63 | 64 | 65 |
|---|---|---|---|---|---|---|---|---|---|---|---|---|
| P:F Ratio | 1:2.0 | 1:2.0 | 1:2.0 | 1:2.0 | 1:2.0 | 1:2.0 | 1:2.0 | 1:2.0 | 1:2.0 | 1:2.0 | 1:2.0 | 1:2.0 |
| NaOH:Phenol ratio | 0.55:1 | 0.55:1 | 0.55:1 | 0.58:1 | 0.58:1 | 0.58:1 | 0.625:1 | 0.625:1 | 0.66:1 | 0.68:1 | 0.68:1 | 0.72:1 |
| $M_w$ solution | 500 | 570 | 700 | 640 | 840 | 1050 | 550 | 590 | 610 | 570 | 930 | 510 |
| $M_w$ Precipitated solution | 590 | 660 | 840 | 760 | 930 | 1250 | 670 | 740 | 760 | 670 | 1030 | 620 |
| Visc. (cP) @ 25° C. | 210 | 470 | 730 | 230 | 500 | 800 | 310 | 230 | 370 | 170 | 410 | 135 |
| Solids content (%) | 51.1 | 51.9 | 49.3 | 48.6 | 48.7 | 49.7 | 51.1 | 49.5 | 49.1 | 48.3 | 49.4 | 49.0 |
| % Butyrolactone (BOR) | | | | | | | | | | | | |
| Bench life (mins) | | | | | | | | | | | | |
| Set time (mins) | | | | | | | | | | | | |
| Compression strength (MPa) after: | | | | | | | | | | | | |
| 1 min. | 1.1 | 1.8 | 2.0 | 1.6 | 1.6 | 2.0 | 2.1 | 2.3 | 2.2 | 2.3 | 2.2 | 2.2 |
| 5 mins. | 1.6 | 2.0 | 2.2 | 2.1 | 2.1 | 2.3 | 2.6 | 2.6 | 2.7 | 2.7 | 2.7 | 2.3 |
| 1 hour | 2.0 | 2.1 | 2.4 | 2.5 | 2.5 | 2.5 | 2.9 | 2.7 | 3.4 | 3.4 | 3.6 | 2.4 |
| 3 hours | 2.1 | 2.2 | 2.5 | 2.7 | 2.6 | 2.9 | 3.0 | 2.7 | 3.8 | 3.7 | 4.0 | 2.4 |
| 24 hours | 2.3 | 2.2 | 2.6 | 3.1 | 2.8 | 3.1 | 3.2 | 2.8 | 4.1 | 3.8 | 4.2 | 2.5 |
| % Butyrolactone (BOR) | | | | | | | | | | | | |
| % Triacetin (BOR) | | | | | | | | | | | | |
| Bench life (mins) | | | | | | | | | | | | |
| Set time (mins) | | | | | | | | | | | | |
| Transverse strength (kgf/cm$^2$) after: | | | | | | | | | | | | |
| 1 min. | 6.3 | 9.9 | 11.3 | 8.8 | 9.1 | 11.0 | 11.8 | 12.3 | 11.8 | 12.2 | 11.3 | 11.8 |
| 5 mins. | 8.4 | 10.2 | 12.1 | 11.3 | 11.8 | 12.6 | 14.1 | 13.6 | 14.6 | 14.8 | 14.6 | 12.6 |
| 1 hour | 11.0 | 11.6 | 13.3 | 13.8 | 13.7 | 14.0 | 15.5 | 14.1 | 18.7 | 18.5 | 19.3 | 12.6 |
| 3 hours | 11.8 | 12.1 | 13.9 | 14.8 | 14.2 | 15.8 | 16.1 | 14.6 | 20.9 | 20.0 | 21.6 | 12.7 |
| 24 hours | 12.6 | 12.3 | 4.0 | 16.8 | 15.4 | 16.1 | 16.4 | 14.7 | 22.0 | 20.0 | 22.4 | 12.9 |

TABLE 8

| | N | O | P | Q | R | S | T | U | V | W | X | Y |
|---|---|---|---|---|---|---|---|---|---|---|---|---|
| P:F Ratio | 1:1.5 | 1:1.5 | 1:1.75 | 1:1.75 | 1:1.75 | 1:1.75 | 1:1.75 | 1:1.95 | 1:1.95 | 1:2.0 | 1:2.0 | 1:2.2 |
| NaOH:Phenol Phenol ratio | 0.625:1 | 0.625:1 | 0.625:1 | 0.625:1 | 0.625:1 | 0.625:1 | 0.625:1 | 0.625:1 | 0.625:1 | 0.625:1 | 0.625:1 | 0.625:1 |
| $M_w$ solution | 440 | 850 | 530 | 1330 | 660 | 680 | 710 | 580 | 930 | 550 | 590 | 500 |
| $M_w$ solution | 570 | 1030 | 630 | 1500 | 780 | 830 | 950 | 690 | 1040 | 670 | 740 | 630 |
| Visc. (cP) @ 25° C. | 400 | 1100 | 360 | 1650 | 260 | 350 | 900 | 300 | 1400 | 310 | 230 | 890 |
| Solids content (%) | 64.3 | 64.4 | 50.1 | 60.6 | 48.3 | 50.7 | 51.2 | 48.8 | 49.6 | 51.1 | 49.5 | 46.9 |
| % Butyrolactone (BOR) | | | | | | | | | | | | |
| Bench life (mins) | | | | | | | | | | | | |
| Set time (mins) | | | | | | | | | | | | |
| Compression strength (MPa) after: | | | | | | | | | | | | |
| 1 min. | 1.4 | 2.7 | 2.3 | 2.2 | 2.5 | 2.7 | 2.4 | 2.5 | 2.4 | 2.1 | 2.3 | 1.9 |
| 5 mins. | 2.0 | 3.4 | 3.3 | 2.4 | 2.7 | 3.0 | 2.4 | 2.8 | 2.7 | 2.6 | 2.6 | 2.0 |
| 1 hour | 2.6 | 3.4 | 3.3 | 2.8 | 2.8 | 3.1 | 2.5 | 2.8 | 2.8 | 2.9 | 2.7 | 2.2 |
| 3 hours | 3.1 | 3.5 | 3.4 | 3.1 | 2.9 | 3.1 | 2.5 | 2.8 | 2.9 | 3.0 | 2.7 | 2.2 |
| 24 hours | 3.4 | 3.6 | 3.5 | 3.2 | 3.1 | 3.2 | 2.5 | 3.1 | 2.9 | 3.2 | 2.8 | 2.3 |
| Butyrolactone (BOR) | | | | | | | | | | | | |
| Triacetin (BOR) | | | | | | | | | | | | |
| Bench life (mins) | | | | | | | | | | | | |
| Set time (mins) | | | | | | | | | | | | |
| Transverse strength (kgf/cm$^2$) after: | | | | | | | | | | | | |
| 1 min. | 6.9 | 14.8 | 12.3 | 11.8 | 12.6 | 13.7 | 12.2 | 12.7 | 12.3 | 11.8 | 12.3 | 10.2 |
| 5 mins. | 10.6 | 18.2 | 17.2 | 12.6 | 13.6 | 15.0 | 12.3 | 14.6 | 13.6 | 14.1 | 13.6 | 11.1 |
| 1 hour | 14.1 | 18.4 | 17.1 | 14.7 | 14.3 | 15.2 | 12.4 | 14.8 | 13.9 | 15.5 | 14.1 | 11.2 |
| 3 hours | 16.2 | 18.5 | 17.7 | 16.1 | 15.4 | 15.2 | 12.6 | 14.8 | 14.3 | 16.1 | 14.6 | 11.4 |
| 24 hours | 17.4 | 18.6 | 17.9 | 16.5 | 15.7 | 15.3 | 12.7 | 15.0 | 14.7 | 16.4 | 14.7 | 11.5 |

We claim:

1. A method of preparing a foundry mould or core wherein an aldehyde is reacted with a phenol at an elevated temperature in the presence of aqueous alkali to produce a resin composition having a weight average molecular weight determined by gel permeation chromatography for the unprecipitated solution not exceeding 1500, the molar ratio of aldehyde to phenol being within the range 1:1 to 3:1 and the alkali being sodium alkali, the resin composition is mixed with a foundry aggregate and an organic ester, the weight of resin composition being up to 1.5% of the weight of the aggregate and the solids content of the resin composition being from about 40% to about 65%, by weight, the weight of ester being within the range 15% to 95% of the weight of the resin composition, the ester being an ester of an alcohol and a $C_1$ to $C_{12}$ carboxylic acid, the mixture is formed to the required shape and is permitted to cure and wherein the compressive strength after twenty four hours is at least 4000 kN/m$^2$.

2. A method according to claim 1 wherein the aldehyde is added gradually to an alkaline solution of the phenol and wherein the compressive strength after twenty four hours is in excess of 5500 kN/m$^2$.

* * * * *